INVENTOR
R. F. EWALD
BY John C. Morris
ATTORNEY

May 10, 1960 R. F. EWALD 2,936,407

MOUNTING AND CONNECTING APPARATUS

Filed May 15, 1957 5 Sheets-Sheet 2

INVENTOR
R. F. EWALD
BY John C. Morris
ATTORNEY

May 10, 1960 R. F. EWALD 2,936,407

MOUNTING AND CONNECTING APPARATUS

Filed May 15, 1957 5 Sheets-Sheet 3

INVENTOR
R. F. EWALD
BY John C. Morris
ATTORNEY

May 10, 1960 R. F. EWALD 2,936,407

MOUNTING AND CONNECTING APPARATUS

Filed May 15, 1957 5 Sheets-Sheet 4

INVENTOR
R. F. EWALD
BY John C. Morris
ATTORNEY

May 10, 1960 R. F. EWALD 2,936,407

MOUNTING AND CONNECTING APPARATUS

Filed May 15, 1957 5 Sheets-Sheet 5

INVENTOR
R. F. EWALD
BY John C. Morris
ATTORNEY

United States Patent Office 2,936,407
Patented May 10, 1960

2,936,407

MOUNTING AND CONNECTING APPARATUS

Robert F. Ewald, Massapequa, N.Y., assignor to Bell Telephone Laboratories, Incorporated, New York, N.Y., a corporation of New York Application May 15, 1957, Serial No. 659,301
2 Claims. (Cl. 317—99)

This invention relates to supporting and interconnecting apparatus, and more particularly to a panel assembly capable of supporting and electrically interconnecting a plurality of component networks.

A number of telephone systems for the automatic identification of calling subscriber numbers have been studied. One system selected for development employs for each subscriber number a network comprising four electrical components. As 10,000 of these networks are required per 10,000-line telephone office, it is clear that a compact, low-cost, easily accessible and reliable network mounting and interconnecting structure is an economic necessity.

Accordingly, an object of this invention is to facilitate the mounting of network and like electrical assemblies or units in a compact and economical manner.

Another object of this invention is an improved panel assembly.

More specifically, an object of the present invention is a simplified and improved panel structure for the mounting and interconnecting of a plurality of network components.

Another object of this invention is a panel assembly of simple and economical construction, which panel is readily accessible for inspection.

A further object of the present invention is an improved sub-unit mounting and interconnecting structure which utilizes space to the best advantage.

These and other objects of this invention are attained in one illustrative embodiment thereof wherein foraminated insulating sheets of a sandwich structure are maintained apart by a spacer assembly. A plurality of horizontal and vertical bus bars, each having integrally formed thereon a plurality, e.g., three, of different types of projections or ears, are positioned in the space between the sheets. One type of projection on the horizontal bus bars extends through openings in what will hereinafter be referred to as the "front sheet" to provide horizontal bus appearances beyond the outer surface thereof. A corresponding type of projection on the vertical bus bars extends through front sheet openings, also to provide bus appearances beyond the outer surface thereof.

Furthermore, end portions of the horizontal and vertical bus bars are formed as projections which extend through openings in the back sheet to provide convenient terminals therebeyond.

A third type of bus bar projection comprises a number of relatively short, squared-off spacer members. These members extend, in the case of the horizontal bars, toward the front of the panel assembly and rest on the inner surface of the front sheet. Similarly, the short, squared-off spacer projections of the vertical bus bars extend toward the back of the panel assembly and rest on the inner surface of the back sheet thereof.

Thus, a feature of this invention is a sandwich of spaced-apart, foraminated, insulating sheets having a series of conductive bus bars in the space therebetween, the bus bars having portions which extend through the sheets to provide projecting terminals.

Furthermore, in accordance with an illustrative embodiment of the principles of the present invention, there is secured to the outer surface of the back sheet of the aforementioned panel assembly a ground strap network comprising vertical and horizontal members which are electrically interconnected. The horizontal members include integrally-formed vertically-extending projections, each of which has a threaded aperture therethrough.

Each of the component assemblies has a mounting screw associated therewith which is designed to screw into one of the noted threaded apertures. By means of the mounting screws, one terminal of each of the component assemblies can be electrically connected to ground; at the same time the assemblies can be thereby mounted in a secure mechanical fashion on the herein-described panel assembly.

Each vertical projection of the horizontal ground strap member defines a mounting position for a component assembly. At each back sheet mounting position there are, in addition to the above-mentioned threaded aperture, two holes. These two back sheet holes are in alignment with two mating holes formed through the front sheet. The aligned holes are designed to receive terminal stake members of the component assemblies.

Thus, a mounted component assembly is electrically connected to, and mechanically mounted on, a horizontal ground strap member by means of the assembly mounting screw, the assembly stake members extending through the aligned holes in the sandwich structure and projecting beyond the outer surface of the front sheet thereof to provide component assembly tie points to which electrical connections can be made.

A complete understanding of the features and advantages of the present invention may be gained from consideration of the following detailed description in conjunction with the accompanying drawing, in which.

Figure 1:
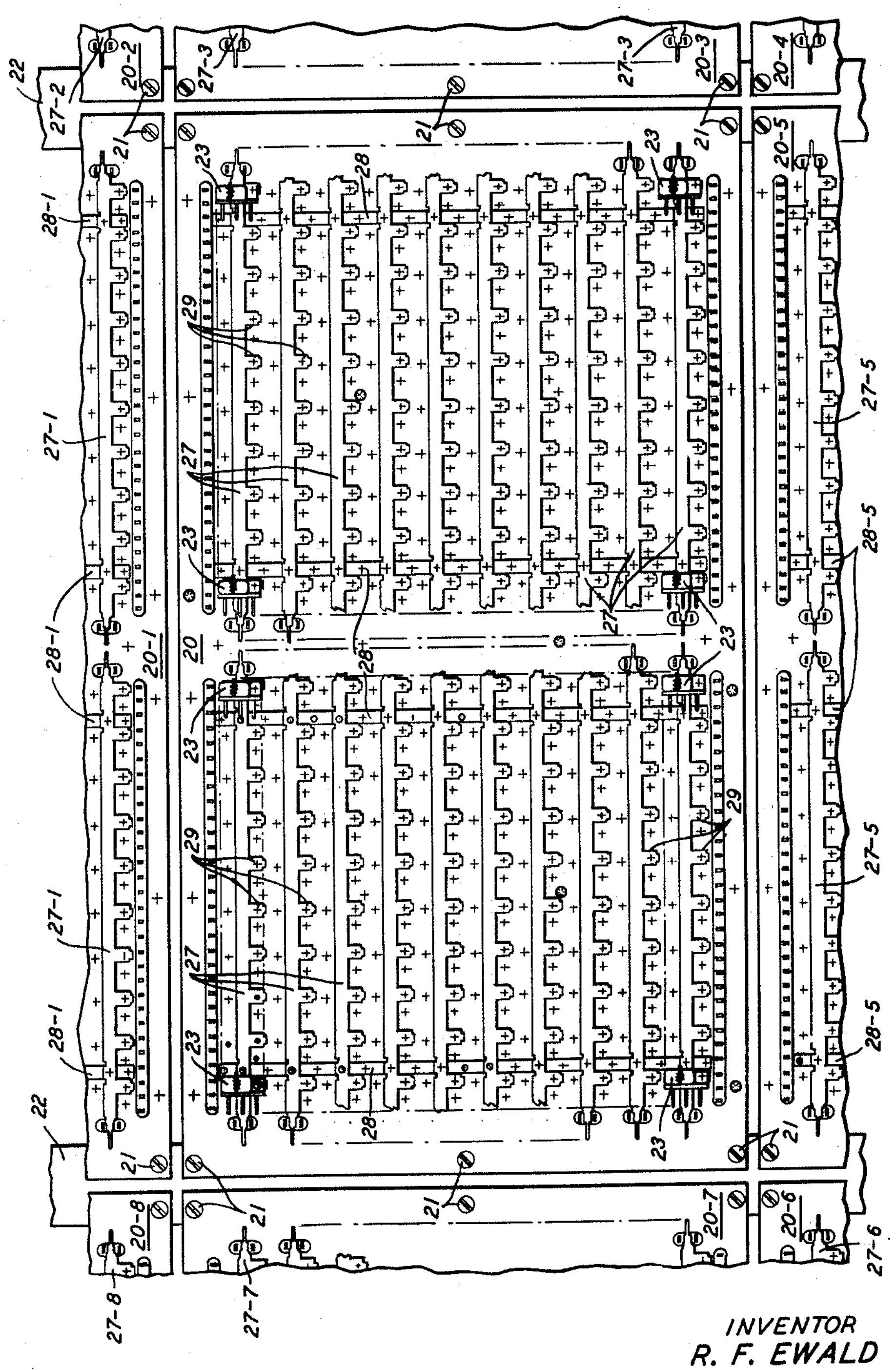
Fig. 1 is an elevational view of the backside of a mounted panel assembly made in accordance with the principles of this invention, portions of adjacent assemblies being shown mounted in typical relation thereto.

Referring now to Fig. 1, there is shown the backside of a complete panel assembly 20 and the backsides of portions of eight other adjacently mounted panel assemblies 20–1, 20–2, 20–3, 20–4, 20–5, 20–6, 20–7 and 20–8, all of the assemblies being made in accordance with aspects of the present invention. The panels are shown supported by means of mounting screws 21 on a frame structure comprising spaced upright members 22.

The panel assembly 20 provides mounting positions for 200 component network assemblies 23. In the interest of clarity of presentation, however, the assembly 20 of Fig. 1 is shown as having mounted thereon only the eight component assemblies 23 situated at the eight corners of its two sections.

The panel assemblies shown in Fig. 1 comprise horizontal and vertical ground strap members 27 and 28, respectively, which are electrically interconnected. The horizontal members 27 include apertured vertically-extending projections or ears 29, which comprise the means by which the component assemblies 23 are mounted on the panels.

Figure 2:
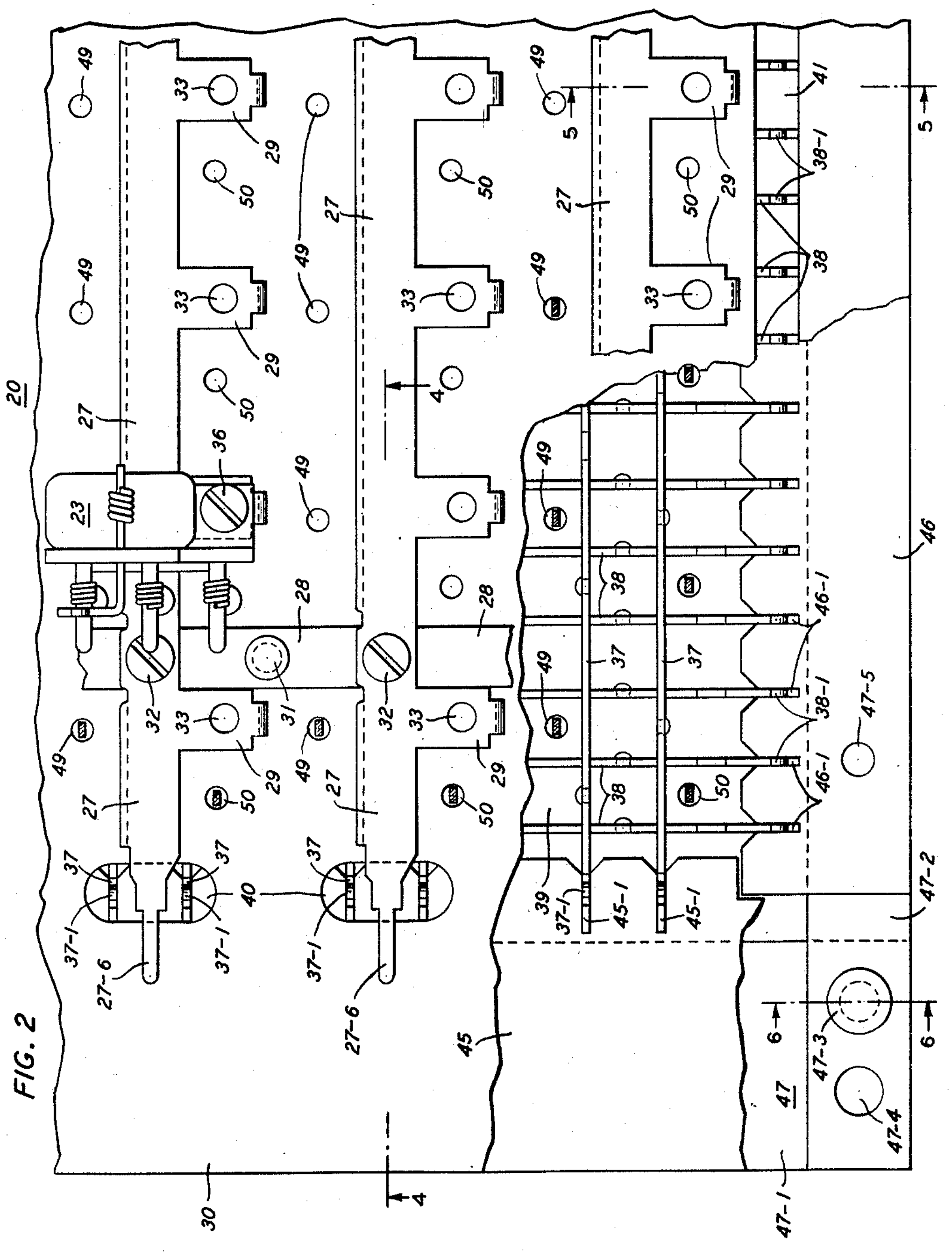
Fig. 2 is an enlarged elevational view of the lower left-hand corner of the center assembly of Fig. 1, a portion thereof being broken away to show the assembly construction more clearly.

Referring now to Fig. 2, there is shown an enlarged view, partially in section, of the lower left-hand corner of the assembly 20 of Fig. 1. The vertical ground straps 28, only one of which is shown in Fig. 2, are securely mounted on the back sheet 30 of the panel assembly 20 by means of rivets 31. The horizontal ground straps 27 are in turn secured and electrically connected to the ground straps 28 by means of screws 32. Each of the horizontal ground strap projections 29 has therethrough a threaded aperture 33 which is designed to receive a mounting screw 60–2 of a component assembly 23; reference may be made to Fig. 3, in particular, for a clear view of the assembly mounting screw 60–2.

Fig. 2 also shows horizontal and vertical bus bar members 37 and 38, respectively, contained between the sheets 30 and 39 of the assembly 20. The horizontal bus bars 37 include projections 37–1 which extend through openings 40 in the back sheet 30 to provide terminal portions therebeyond. Similarly, the vertical bus bars 38 include projections 38–1 which extend through openings 41 in the back sheet 30, also to provide terminal portions therebeyond.

In an illustrative assembled panel, the sandwiched-in bus bars 37 and 38 are maintained apart in spaced alignment by combs 45 and 46, respectively. The combs 45 and 46, which include, respectively, guiding slots 45–1 and 46–1 for the bus bars 37 and 38, rest directly against the inner surface of the back sheet 30 and are separated from the inner surface of the front sheet 39 by a spacer assembly 47.

The assembly 47, which maintains the front and back insulating sheets apart a preassigned distance, comprises vertical and horizontal members 47–1 and 47–2, respectively, which are connected together by fastening means 47–3. The openings 47–4 are in alignment with corresponding openings in the front and back sheets and serve to receive the aforementioned panel mounting screws 21. Openings 47–5 also are in alignment with corresponding openings in the front and back sheets; these openings serve to receive panel fastening means of a type which securely maintain the assembly 20 together.

The spacer assembly also serves to seal the intersheet bus bar portions against the deleterious effects of dust, or other matter that might form undesired electrical paths between the sandwiched-in bus portions.

As shown in Fig. 2, there is at each component assembly mounting position on the panel two through-holes 49 and 50 for receiving terminal stake members of the component assemblies 23.

Figure 3:
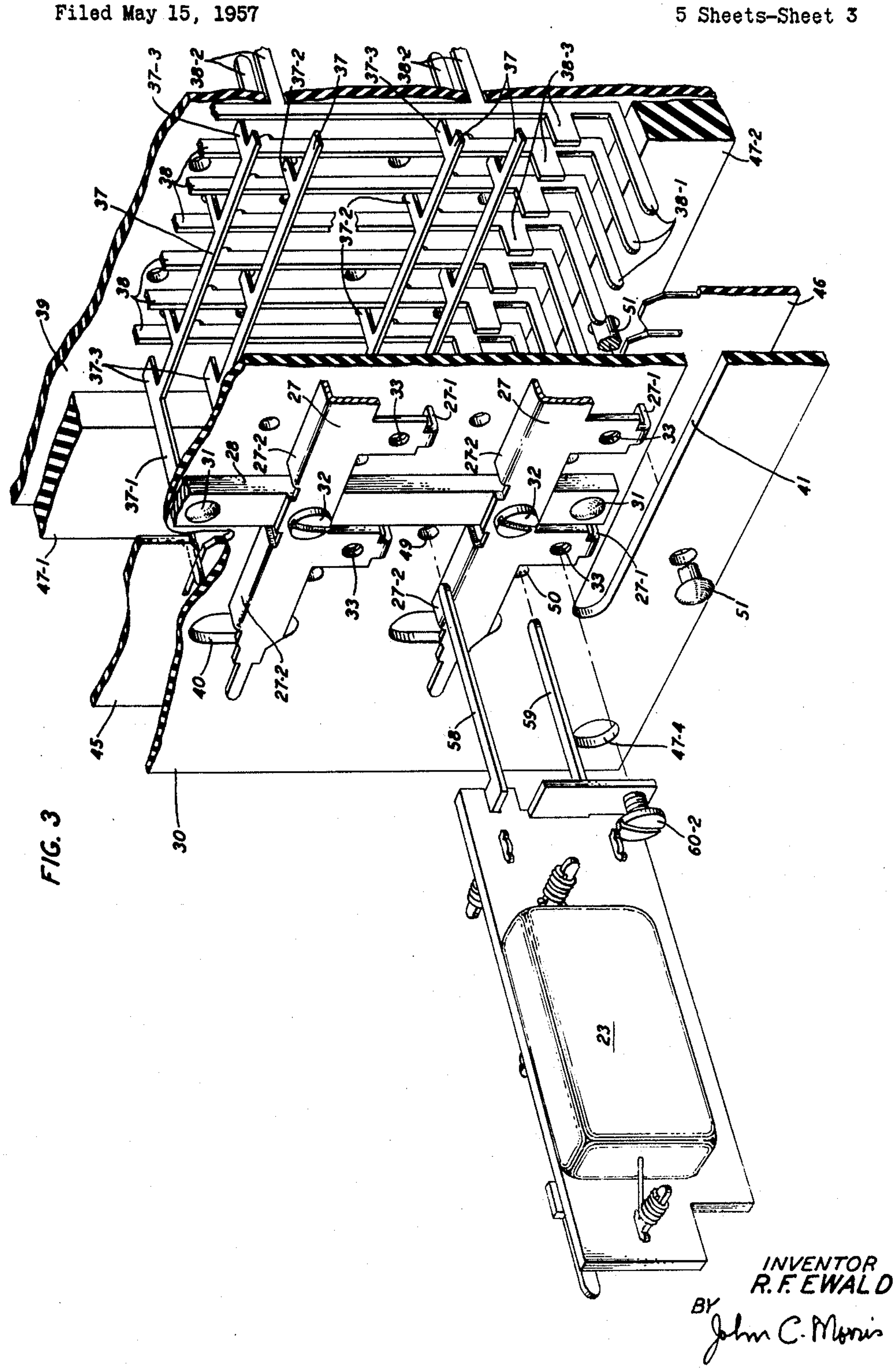
Fig. 3 is an enlarged and exploded perspective view of the lower left-hand corner of the center assembly of Fig. 1, a component assembly being there shown in aligned relation with respect to its panel assembly mounting holes.

Fig. 3 is an exploded perspective view of a portion of the panel assembly 20 and serves, for one thing, to show clearly the interrelationship of the above-mentioned panel assembly parts.

In Fig. 3, there are shown frontwardly-extending portions of the horizontal and vertical bus bars. The horizontal bus bars 37 include projections 37–2 which extend through openings in the front panel sheet 39 and project therefrom. Similarly, the vertical bus bars 38 include projections 38–2 which extend through openings in the front sheet 39 and also project therefrom.

Additionally, the horizontal and vertical bus bars comprise integrally-formed squared-off projections or ears, which unlike the bus bar projections heretofore described, do not extend out of the intersheet region. The squared-off projecting portions 37–3 of the horizontal bars 37 rest against the inner surface of the front sheet 39 of the panel assembly, while the squared-off projections 38–3 of the vertical bus bars 38 rest, in an assembled panel, against the inner surface of the back sheet 30.

The spacer projections 37–3 and 38–3 maintain the horizontal and vertical bus bars apart from each other so as to insure that each bus bar forms an electrically isolated conductive path.

Fig. 3 also clearly shows the structure of the horizontal ground straps 27. The straps 27 include stepped portions 27–1 and 27–2 which serve as legs on which the straps 27 rest on the back insulating sheet 30.

Rivets 51, advantageously of the type shown in Fig. 3, are employed to hold an assembled panel securely together.

Figure 4:
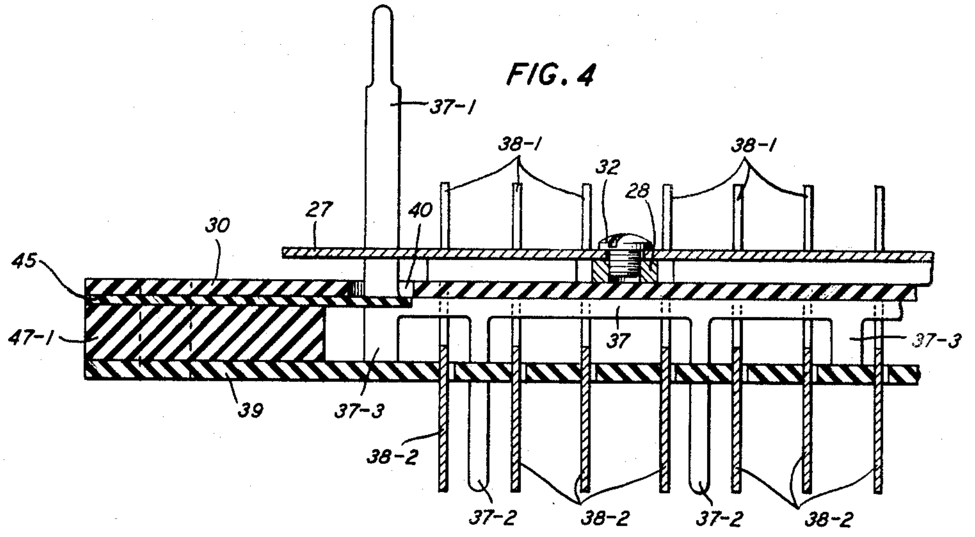
Fig. 4 is a sectional view of the structure of Fig. 2 as viewed from the line 4—4.

Turning now to Fig. 4, there is shown a sectional view of the assembly of Fig. 2 as seen from the line 4—4 thereof. The three types of horizontal bus bar projections, namely, 37–1, 37–2 and 37–3, are clearly shown in Fig. 4, and the frontwardly and backwardly projecting terminal portions 38–2 and 38–1, respectively, of the vertical bus bars 38 are also shown therein.

Figure 5:
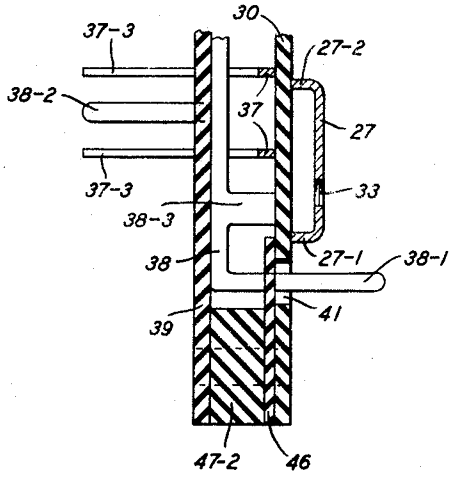
Fig. 5 is a sectional view of the structure of Fig. 2 as viewed from the line 5—5.

Fig. 5 is a sectional view in which all three types of vertical bus bar projections, namely, 38–1, 38–2 and 38–3, are clearly shown.

Figure 6:
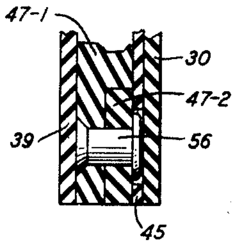
Fig. 6 is a sectional view of the structure of Fig. 2 as viewed from the line 6—6.
Figure 8:
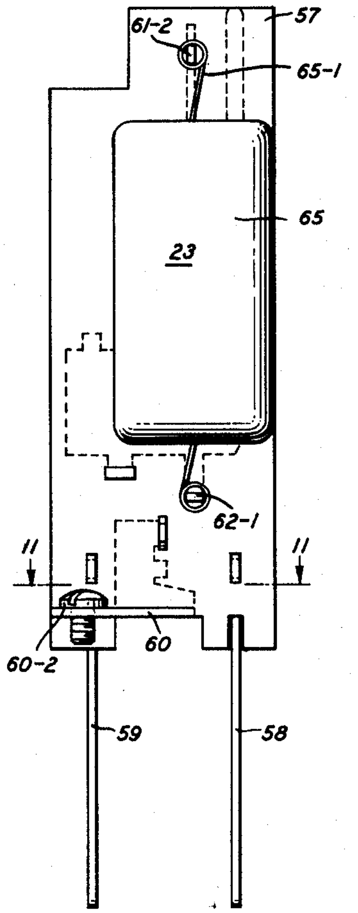
Fig. 8 is a front elevational view of a component assembly of the type intended to be mounted in illustrative embodiments of the present invention.

Fig. 6, which is a sectional view of the assembly of Fig. 2, as seen from the line 6—6, in the lower left-hand corner thereof, shows the manner in which the interfitting spacer members 47–1 and 47–2 are secured together by a fastening element 56. The spacer members 47–1 and 47–2 and the combs 45 are apertured so that the ends of the fastening element 56 rest against the inner surfaces of the insulating sheets. The sheets 30 and 39 are in turn held securely against the ends of the element 56 by assembly fastening means of the type above-mentioned, i.e., element 51, seen most clearly in Fig. 3.

Figure 7:
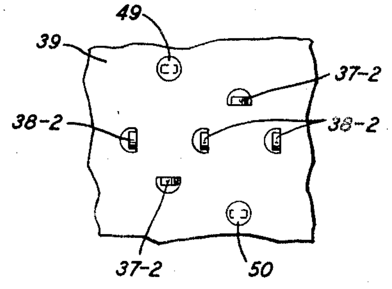
Fig. 7 is a front elevational view of a portion of the front sheet of the center assembly of Fig. 1.

Fig. 7 is a view of a portion of the front sheet 39. Each component mounting position has associated with it, on the front insulating sheet 39, a portion similar to that shown in Fig. 7. The portion includes seven openings, five of which have bus bar appearances 37–2 and 38–2 extending therethrough, and the other two of which, namely, 49 and 50, are designed to receive the stake terminals 58 and 59, respectively, of a component assembly 23; the openings 49 and 50 can be most clearly seen in Fig. 3.

Figs. 8, 9, 10 and 11 show in detail a component assembly 23 of the type with which the herein-described panel assembly 20 is designed to be combined.

The assembly 23 comprises a mounting board 57, made of a suitable insulating material, in which are securely staked conductive elements 58, 59, 60 and 61. Conductive element 62, on the other hand, is staked to the board 57 so as to be free to pivot slightly about a transverse axis to compensate for expansion or contraction of the mounting board 57. Such compensation reduces the strains to which the component leads would otherwise be subjected.

The conductive element 61 includes a component assembly input terminal 61–1 and a terminal 61–2 to which one lead 65–1 of the component 65 is electrically and mechanically secured. The other lead 65–2 of the component 65 is connected to a terminal 62–1 of the element 62. The element 62 also includes terminal portions 62–2, 62–3 and 62–4 which are, respectively, connected to leads 66–1, 67–1 and 68–1 of the components 66, 67 and 68.

The other lead 67–2 of the component 67 is connected to a terminal portion 60–1 of the element 60. The conductive element 60 also includes a mounting screw 60–2 which, as mentioned above and as clearly shown in Fig. 3, is designed to screw into one of the threaded apertures 33 in the horizontal ground strap projections 29, and thereby connect the lead 67–2 to the ground strap network of the panel assembly 20.

The lead 66–2 of the electrical component 66 is connected to a terminal projection 58–1 of the conductive element or stake 58. Similarly, the lead 68–2 of the component 68 is connected to a terminal projection of the conductive stake 59.

Thus, when a component assembly 23 is inserted, as indicated in Fig. 3, into a panel assembly 20, of a type made in accordance with the principles of the present invention, the element 60 of an assembly 23 is electrically connected to the ground network of the assembly 20 when the mounting screw 60–2 is threaded into an aperture 33.

The terminal stakes 58 and 59 of a mounted assembly 23 extend through the panel 20 and, respectively, through the openings 49 and 50 thereof to project beyond the outer surface fo the front sheet 39.

The stake members 58 and 59, as well as the terminal portions 58–1, 59–1, 60–1, 61–1, 61–2, 62–1, 62–2, 62–3 and 64–4 of the assembly 23, and the panel assembly bus bar appearances 37–1, 37–2, 38–1 and 38–2, are advantageously square or rectangular in cross section so that wire-wrapped connections of the type disclosed in Patent 2,759,166, R. F. Mallina, August 14, 1956, can be easily made thereto.

Additionally, it is noted that the horizontal ground strap members 27 have their ends 27–6 formed to receive wire-wrapped connections thereon.

One specific illustrative embodiment of this invention comprises an assembled panel 20 having 200 of the described component assemblies 23 securely mounted thereon. One such illustrative assembly measures only 21 by 11½ inches.

Figure 9:
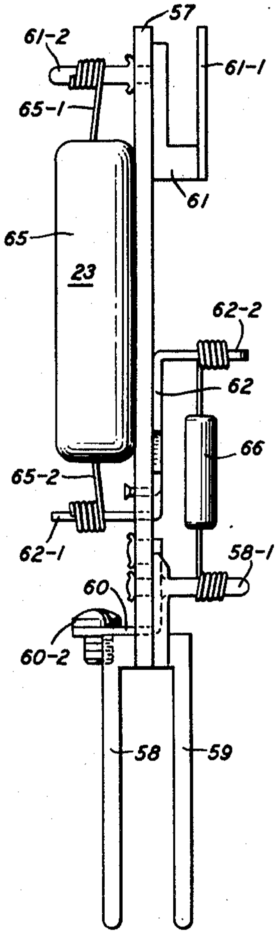
Fig. 9 is a side view of the assembly of Fig. 8.
Figure 10:
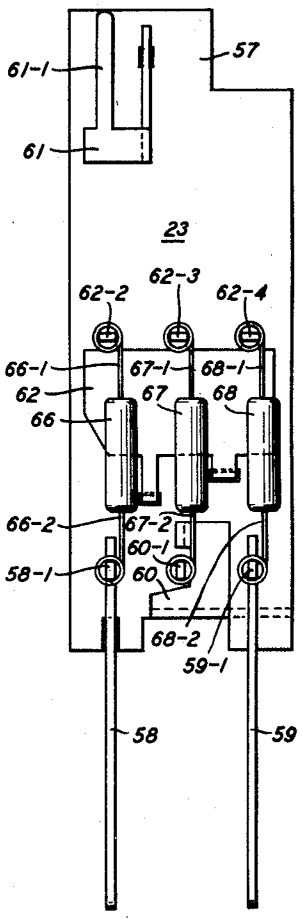
Fig. 10 is a back elevational view of the assembly of Fig. 8.
Figure 11:
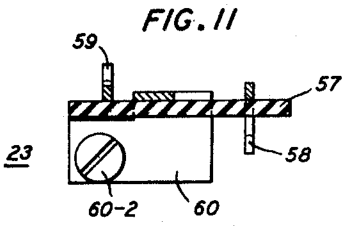
Fig. 11 is a sectional view of the structure of Fig. 8 as viewed from the line 11—11.

One manner in which the above-described apparatus can be interconnected involves wire-wrapping an input line onto a component assembly input terminal 61–1, the terminal 61–1 being clearly shown in Fig. 9, for example. Then, the mounted assembly terminal stakes 58 and 59, which extend, respectively, through the sheet openings 49 and 50, are connected by suitable jumper wires in any desired pattern to the arrangement of bus bar appearances which extend beyond the front sheet in the immediate vicinity of the projecting stakes. Then, and referring back to Fig. 1, the back sheet horizontal and vertical bus bar appearances are electrically connected, in accordance with one specific illustrative embodiment of the invention, to the immediately adjacent and in-line bus appearances on the adjacent panel assemblies 20–1, 20–2, 20–3, 20–4, 20–5, 20–6, 20–7 and 20–8.

A horizontal end panel or a vertical top or bottom panel, not illustrated in Fig. 1, may then in turn be suitably connected to associated circuitry. In other words, conductors may be led to and from these panels to connect the panel mounted component parts into an electrical system.

Fanning strips and accessory apparatus may be combined with illustrative embodiments of this invention by those skilled in the art of wire-installing to facilitate the running of leads to tie points of the panel assemblies.

Thus, it is seen that the principles of the present invention enable the construction of a compact supporting and interconnecting structure for electrical component parts, which requires a minimum amount of space and which supports the components and their associated bus bars in a mechanically secure and electrically stable manner.

It is to be understood that the above-described arrangements are illustrative and not restrictive of the principles of the present invention. Numerous other arrangements may be devised by those skilled in the art without departing from the spirit and scope of this invention.

What is claimed is:

1. In combination, a panel assembly and a plurality of electrical component networks, each component network having a mounting screw and a plurality of terminal stake members, said panel assembly comprising a spacer assembly, a first insulating sheet, and a second insulating sheet, said sheets being maintained apart a preassigned distance by said spacer assembly, said panel assembly further comprising a plurality of horizontal and vertical bus bars positioned in the space between said sheets, said bus bars having first portions which extend through said first sheet, second portions which extend through said second sheet, and third spacer portions which rest, respectively, against the inner surfaces of said sheets, said panel assembly still further comprising a ground network secured to the outer surface of said first sheet, said ground network including terminal end portions and a plurality of electrically-interconnected horizontal members, each of said horizontal members having a plurality of integrally-formed vertically-extending apertured projections, each of said apertured projections defining a mounting position for one of said electrical component networks, each of said mounting positions having associated therewith a number of aligned first and second sheet openings, said number of openings corresponding to the number of terminal stake members on each of said component networks, whereby said plurality of component networks can be mounted on said panel assembly by securing said component network mounting screws in said ground network projections, said component network terminal stake members thereby extending through said aligned sheet openings and providing projecting terminal portions beyond the outer surface of said second sheet, whereby said second bus bar portions can be electrically connected to said stake members, and said ground network terminal portions and said first bus bar portions are available for making electrical connections to associated circuitry.

2. A panel assembly comprising a spacer assembly, first and second insulating sheets, said sheets being maintained apart by said spacer assembly, a plurality of orthogonally-related bus bars positioned in the space between said sheets, said bus bars having first portions which extend through said first sheet, second portions which extend through said second sheet, and third spacer portions which rest against the inner surfaces of said sheets, a ground network secured to the outer surface of said first sheet, said ground network including a plurality of parallel electrically-interconnected members, each of said members including a plurality of orthogonal integrally-formed apertured projections, each of said apertured projections defining a mounting position for an electrical component network, and a plurality of aligned first and second sheet openings associated with each of said mounting positions, whereby a plurality of electrical component networks, each having a plurality of terminal stake members, may be respectively secured to said apertured projections, the stake members thereby extending through said aligned sheet openings and providing projecting terminal portions beyond the outer surfaces of said second sheet.

References Cited in the file of this patent

UNITED STATES PATENTS

| | | |
|---|---|---|
| 1,929,925 | Kuhn | Oct. 10, 1933 |
| 2,253,136 | Richter | Aug. 19, 1941 |
| 2,502,291 | Taylor | Mar. 28, 1950 |
| 2,606,233 | Schymik | Aug. 5, 1952 |
| 2,740,944 | Harrison | Apr. 3, 1956 |

FOREIGN PATENTS

| | | |
|---|---|---|
| 132,216 | Great Britain | Sept. 11, 1919 |
| 562,577 | Great Britain | July 7, 1944 |